(12) United States Patent
Dombek

(10) Patent No.: US 6,526,985 B1
(45) Date of Patent: Mar. 4, 2003

(54) APPARATUS FOR PERFORATING TUBULAR WRAPPERS OF ROD-SHAPED ARTICLES

(75) Inventor: Manfred Dombek, Dassendorf (DE)

(73) Assignee: Hauni Maschinenbau AG, Hamburg (DE)

( * ) Notice: Subject to any disclaimer, the term of this patent is extended or adjusted under 35 U.S.C. 154(b) by 0 days.

(21) Appl. No.: 09/852,780

(22) Filed: May 11, 2001

Related U.S. Application Data

(63) Continuation-in-part of application No. 09/457,346, filed on Dec. 8, 1999, now Pat. No. 6,363,942.

(30) Foreign Application Priority Data

Dec. 8, 1998 (DE) .......................................... 198 56 413

(51) Int. Cl.[7] ................................................. A24C 1/38
(52) U.S. Cl. ........................ 131/281; 131/27.1; 131/55; 131/56; 131/57; 131/57.5; 219/121.7; 219/121.77; 219/121.6; 219/121.74; 219/121.76
(58) Field of Search ............................... 131/281, 27.1, 131/55, 56, 57, 57.5; 219/121.7, 121.77, 121.6, 121.74, 121.76

(56) References Cited

U.S. PATENT DOCUMENTS

| | | |
|---|---|---|
| 4,281,670 A | 8/1981 | Heitmann et al. |
| 5,135,008 A | 8/1992 | Oesterling et al. |
| 5,746,229 A * | 5/1998 | Draghetti et al. ............ 131/281 |
| 6,363,942 B1 * | 4/2002 | Dombek et al. ............. 131/281 |

* cited by examiner

Primary Examiner—Steven P. Griffin
Assistant Examiner—Dionne A. Walls
(74) Attorney, Agent, or Firm—Venable, LLP; Robert Kinberg; Catherine M. Voorhees

(57) ABSTRACT

Successive cigarettes of a series of cigarettes, such as filter cigarettes, are transported sideways in the axially parallel peripheral flutes of a rotary drum-shaped conveyor to the inlet(s) of a straight or V-shaped rolling channel or of two successive straight channels defined by the rolling surface(s) of one or two stationary block-shaped rolling members and the external surface of an endless belt trained over several rollers and being at least partially confined in a recess or groove of the conveyor in such a way that the surface(s) of the rolling member(s) cooperate with the surface of the belt to roll successive cigarettes in the channel or channels about their longitudinal axes while one or more beams issuing from one or more lasers or other radiation source(s) impinge upon the wrappers of the cigarettes rolling in the channel or channels. The belt lifts successive cigarettes out of the respective flutes at the inlet and permits successive treated cigarettes to enter oncoming empty flutes at the outlet of the single rolling channel or each rolling channel.

26 Claims, 8 Drawing Sheets

APPARATUS FOR PERFORATING TUBULAR WRAPPERS OF ROD-SHAPED ARTICLES

CROSS-REFERENCE TO RELATED CASES

This is a continuation-in-part of the commonly owned U.S. patent application Ser. No. 09/457,346 filed Dec. 8, 1999 by Manfred Dombek and Helmut voss for "PERFORATING APPARATUS", now U.S. Pat. No. 6,363,942.

Each and every U.S. and foreign patent and patent application, inclusive of the German priority patent application Serial No. 198 56 413.9 filed Dec. 8, 1998, identified in the specification of the present application is to be considered as being incorporated herein by reference.

BACKGROUND OF THE INVENTION

The invention relates to improvements in methods of and in apparatus for regulating the permeability of tubular wrappers of rod-shaped commodities, e.g., of the envelopes of plain or filter cigarettes or other rod-shaped smokers' products. More particularly, the invention relates to improvements in methods of and in apparatus for increasing the permeability of tubular wrappers with laser beams or with beams of other suitable high-energy penetrative radiation.

It is known to perforate selected portions of tubular wrappers of rod-shaped smokers' products (e.g., plain or filter cigarettes and hereinafter referred to as filter cigarettes) with one or more laser beams which are focussed upon selected portions of the wrappers while the filter cigarettes roll about their respective axes. In many instances, the filter cigarettes are caused to roll during sidewise movement through a rolling channel which is bounded by a surface of a stationary rolling member and a surface of a moving rolling member (e.g., a conveyor which advances successive filter cigarettes of a series of such cigarettes sideways toward, along and beyond the combined rolling and perforating station).

Reference may be had, for example, to U.S. Pat. No. 4,281,670 (granted Aug. 4, 1981 to Heitmann et al. for "APPARATUS FOR INCREASING THE PERMEABILITY OF WRAPPING MATERIAL FOR ROD-SHAPED SMOKERS' PRODUCTS"). The patented apparatus employs a source of one or more laser beams which are focussed upon successive rolling cigarettes while the cigarettes are caused to move sideways by a drum-shaped conveyor and are compelled to roll in response to engagement with a rolling member, e.g., a moving belt, a rotating drum or the like. Since a cigarette which is caused to rotate about its axis is compelled to simultaneously move sideways from the inlet to the outlet of a rolling channel, the means for focussing the laser beam or beams upon the wrapper of the cigarette in the rolling channel must be capable of causing the beam or beams to move with the rolling cigarette. In order to ensure that a laser beam which impinges upon the wrappers of cigarettes in the rolling channel will perforate selected portions of successive wrappers in a predictable manner, it is necessary to ensure that the angular (rolling) and sidewise movements of each cigarette entering the rolling channel are identical to those of previously or subsequently treated cigarettes. This necessitates a pronounced frictional engagement between the wrapper of a cigarette in the rolling channel on the one hand, and the surfaces which bound the rolling channel on the other hand. At least one of these surfaces is caused to move relative to the other surface. Pronounced frictional engagement between the wrapper of a cigarette and the rolling surfaces is apt to cause deformation (even bursting) and/or defacing of the tubular wrapper.

OBJECTS OF THE INVENTION

An object of the invention is to provide an apparatus which is constructed and assembled and which can be operated in such a way that, even though successive rod-shaped articles which are caused to advance through the rolling station are compelled to move in a highly predictable fashion, they are treated gently and are caused to change their permeabilities in an optimum manner.

Another object of the invention is to provide the apparatus with novel and improved means for moving successive rod-shaped articles through the rolling station.

A further object of the invention is to provide an apparatus which can properly perforate the tubular wrapper of a cigarette or another rod-shaped smokers' product even though the beam or beams of radiation need not penetrate though the rod-shaped filler (such as a filler of tobacco and/or filter material for tobacco smoke) of the commodity in the rolling channel.

An additional object of the invention is to provide a simple, compact and reliable apparatus which can be utilized in production lines (e.g., for the making and packing of filter cigarettes) as a superior substitute for presently known perforating apparatus.

Still another object of the invention is to provide an apparatus wherein the rod-shaped articles are caused to enter into and to rotate in the rolling channel in a novel and improved way.

A further object of the present invention is to provide an apparatus which ensures gentle but highly predictable treatment of successive rod-shaped articles during the important stages including entry into and movement out of the rolling station.

Another object of the instant invention is to provide the apparatus with novel and improved means for moving rod-shaped articles sideways toward, through and beyond the rolling station.

An additional object of the invention is to provide a novel and improved method of manipulating cigarettes or other rod-shaped products preparatory to, during and following changes in the permeability of their tubular wrappers.

Still another object of the invention is to provide a novel and improved method of increasing the permeabilities of tubular wrappers of filter cigarettes of unit length or multiple unit length.

A further object of the invention is to provide a method of guiding and moving successive rod-shaped articles, such as filter cigarettes, during transition from sidewise movement to combined sidewise and rolling movement and/or vice versa.

Another object of the invention is to provide novel and improved means for rolling successive ones of short or long series of rod-shaped articles about their respective axes.

An additional object of the present invention is to provide an apparatus which can simultaneously perforate several selected portions of tubular wrappers of rod-shaped smokers' products, e.g., in a filter rod making machine, in a cigarette making machine, in a filter cigarette making machine (known as tipping machine), in a cigarette packing machine, or in a path between two successive machines of the above outlined character.

SUMMARY OF THE INVENTION

One feature of the present invention resides in the provision of an apparatus for increasing the permeability of a tubular wrapper of an elongated rod-shaped article, e.g., a filter cigarette of double unit length wherein a filter mouth-piece of double unit length is located between two plain cigarettes of unit length and wherein a change of permeability normally involves the making of perforations in the wrapper of the mouth-piece prior to subdivision of the article into two filter cigarettes of unit length.

The improved apparatus comprises a first rolling member and a second rolling member which is movable realative to the first rolling member. The rolling members respectively have first and second rolling surfaces which define at least one rolling channel having a height such that, as a result of movement of the second rolling member relative to the first rolling member and upon entry into the at least one channel, the article is compelled to roll about its axis and to move sideways from the inlet to the outlet of the at least one channel. This can be readily accomplished by selecting the height of the at least one channel (i.e., the distance between the first and second rolling surfaces) in such a way that it is only slightly less than the diameter of the article.

The apparatus further comprises a source of at least one beam of high energy radiation (e.g., a laser beam and hereinafter called beam of penetrative radiation), means (e.g., a suitable optical system) for focussing the at least one beam along at least one path defined at least in part by one of the rolling members and upon the wrapper of the article in the at least one rolling channel, and means for conveying the article toward the inlet and away from the outlet of the at least one rolling channel. In accordance with a feature of the invention, the second rolling member comprises at least one flexible element having a portion which is located within the conveying means.

The first rolling member is or can be stationary and the at least one flexible element can constitute an endless flexible element (e.g., an endless belt) The conveying means can comprise a rotary wheel- or drum-shaped conveyor.

The apparatus preferably further comprises means (such as one or more pulleys or rollers) for guiding the aforementioned portion of the at least one flexible element along a path which extends between the inlet and the outlet of the at least one rolling channel and wherein the article is disengaged from the conveying means and is free to roll about its axis as a result of contact with the rolling surfaces.

The means for guiding the at least one flexible element can include at least 2n rollers or pulleys (n is the number of rolling channels). The conveying means can be provided with at least one recess for the rollers or pulleys of the guide means.

In accordance with a presently preferred embodiment, the apparatus comprises first and second guide rollers which are respectively located at the inlet and at the outlet of the at least one rolling channel and are respectively rotatable about first and second axes (preferably about two parallel axes). The aforementioned portion of the at least one flexible element is adjacent the at least one rolling channel and is arranged to disengage the article from the conveying means and to maintain the article in contact with the first rolling surface, and the axes of the two guide rollers are spaced apart from each other a distance which at least matches the circumferential length of the article in the at least one channel to thus ensure that the article completes at least one full revolution about its longitudinal axis while it rolls during advancement from the inlet to the outlet of the at least one rolling channel.

The aforementioned first guide roller can be said to constitute means for effecting a transfer of the article from the conveying means (e.g., from an axially parallel flute provided in the periphery of a rotary drum- or wheel-shaped conveyor) onto the aforementioned portion of the at least one flexible element at the inlet of the at least one rolling channel, and the second guide roller can be said to constitute or to form part of a means for effecting a transfer of the article from the at least one flexible element onto the conveying means (e.g., into an oncoming empty flute of the rotary conveyor) at the outlet of the at least one rolling channel.

The conveying means is or can be arranged to transport the article sideways along an elongated path extending toward, through and beyond the at least one rolling channel. The apparatus employing such conveying means can further comprise a third rolling member which is adjacent the elongated path downstream of the outlet of the at least one rolling channel and defines with the second rolling member a second rolling channel. The second rolling member cooperates with the third rolling member to cause the article to roll about its axis during sidewise movement through the second channel, and such apparatus further comprises a second source of at least one second beam of penetrative radiation as well as means for focussing the at least one second beam along at least one path which is defined (at least in part) by the second and/or third rolling member and upon the wrapper of the article rolling in the second channel. Such apparatus renders it possible to provide two different portions of the tubular wrapper of a rod-shaped article (such as the wrapper of the filter mouthpiece of the aforediscussed filter cigarette of double unit length) with two sets of perforations in two successive stages or steps.

Alternatively, and if the conveying means includes means for transporting along the aforementioned elongated path a series of successive articles, one of the articles of such series can be caused to roll in the at least one channel while another article of the series is caused to roll in the second channel.

The aforementioned portion of the at least one flexible element which constitutes or forms part of the second rolling member is preferably guided in such a way that it maintains the article out of contact with the conveying means while the article is caused to roll in the at least one rolling channel.

The first rolling member is or can be stationary, and the at least one path for the at least one beam of penetrative (such as coherent) radiation can be defined, at least in part, by at least one opening or window which is provided in the first rolling member.

The at least one channel is or can constitute a linear (i.e., at least substantially straight) channel.

At least one of the rolling surfaces bounding the at least one rolling channel can include a curved portion in the region of the inlet and/or outlet of the at least one rolling channel. It is often preferred to provide the at least one curved portion on the first rolling surface such curved portion can constitute a concave portion of the respective rolling surface. The center of curvature of the curved portion of one of the rolling surfaces (normally the first rolling surface) is or can be located on the axis of the aforementioned guide roller at the inlet or outlet of the at least one rolling channel.

The first and second rolling members can define a second rolling channel which is aligned with the at least one rolling channel, and such apparatus can further comprise a source of at least one second beam of penetrative radiation as well as means for focussing the at least one second beam upon a second portion of the article rolling in the second channel while a first portion of such article rolls in the at least one channel.

The at least one channel can include mutually inclined first and second sections which are respectively adjacent the inlet and the outlet of the channel. The second rolling surface of the apparatus employing such channel is preferably provided with a curved intermediate zone between the two mutually inclined sections of the channel. Such apparatus can further comprise first and second guide rollers (e.g., pulleys) one of which is adjacent the second rolling surface at the inlet and the other of which is adjacent the second rolling surface at the outlet of the channel. A third guide roller can be installed adjacent the intermediate zone of the second rolling surface and the flexible element is trained over such guide rollers. The first rolling surface can include a median portion which is complementary to and confronts the intermediate zone; such median portion and the intermediate zone preferably define a channel portion of constant width.

The focussing means of the just outlined modified apparatus can comprise means for focussing the at least one beam of penetrative radiation along a single path upon the wrappers of successive articles rolling in the second section of the at least one channel.

Alternatively, the source of radiation can include means for generating first and second beams of penetrative radiation, and the focussing means of such apparatus can comprise first and second focussing units which respectively direct the first and second beams of penetrative radiation upon the wrappers of successive articles rolling in the first and second sections of the at least one channel.

The first and second sections of the rolling channel can make an obtuse angle, e.g., an angle which equals or approximates 150°.

It is presently preferred to construct and assemble the improved apparatus in such a way that the rolling members constitute the only means for moving articles in the rolling channel from the inlet to the outlet; the at least one flexible element of the second rolling member is driven by a suitable prime mover in order to cause successive articles to roll along the first rolling surface in a direction to cause successive articles to advance toward the outlet of the channel.

Another feature of the present invention resides in the provision of a method of perforating (i.e., of changing the permeability of) a tubular wrapper of an elongated rod-shaped article with at least one laser beam or another beam of high-energy penetrative radiation. The improved method comprises the steps of conveying the article sideways along a first path (e.g., along a portion of a circular path), moving the article sideways from the first path into a second path, rolling the article in the second path, focussing the at least one beam of radiation upon the wrapper of the article rolling in the second path, and returning the article from the second path into the first path (or moving the article from the second path into a third path which may but need not form part of the first path).

The focussing step can include simultaneously or seriatim directing a plurality of beams of penetrative radiation upon longitudinally spaced apart portions of the wrapper of the article while the article is being rolled in the second path.

The method can further comprise the steps of moving the articles sideways from the second path into a third path, rolling the articles in the third path, and focussing at least one beam of penetrative radiation upon the wrapper of the article rolling in the third path prior to the returning step.

The focussing step can include focussing two beams of penetrative radiation upon two discrete articles rolling in two mutually inclined portions of the second path.

Alternatively, the focussing step can include focussing the at least one beam of penetrative radiation upon successive articles rolling in only one of two mutually inclined successive sections of the second path.

The novel features which are considered as characteristic of the invention are set forth in particular in the appended claims. The improved permeability increasing apparatus itself, however, both as to its construction and the modes of assembling and utilizing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
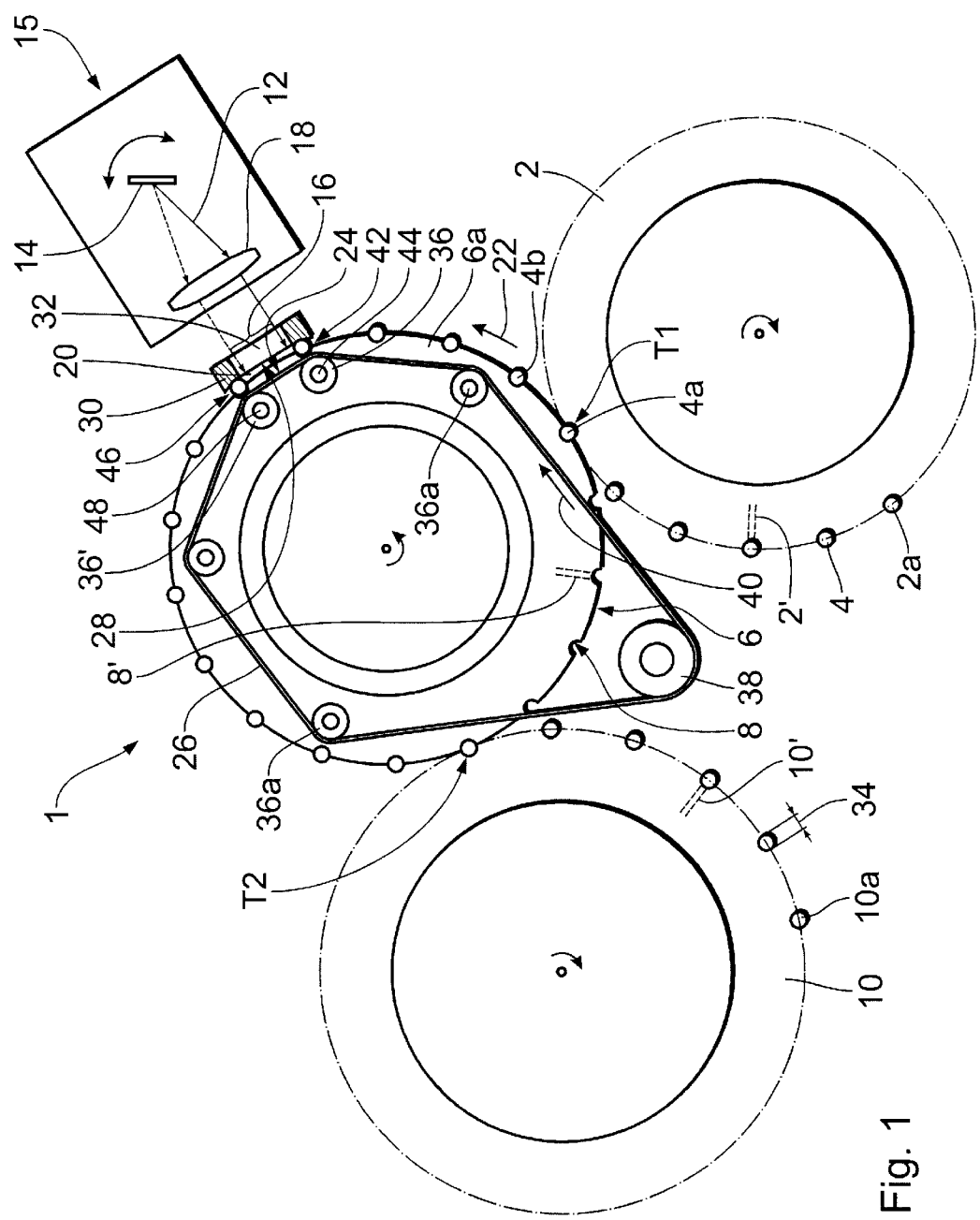
FIG. 1 is a fragmentary schematic partly elevational and partly sectional view of a perforating apparatus which embodies one form of the present invention and comprises a single combined article rolling and article perforating station.

FIG. 1 illustrates certain relevant parts of a perforating apparatus 1 which can be installed in a filter tipping machine, e.g., a machine of the character disclosed in commonly owned U.S. Pat. No. 5,135,008 granted Aug. 4, 1992 to Oesterling et al. for "METHOD OF AND APPARATUS FOR MAKING FILTER CIGARETTES". The apparatus 1 comprises a first rotary wheel- or drum-shaped conveyor 2 having axially parallel peripheral flutes 2a serving to move discrete filter cigarettes 4 of double unit length sideways into successive axially parallel peripheral flutes 8 of a second rotary wheelor drum-shaped conveyor 6 serving as a means for conveying successive cigarettes 4 sideways toward the inlet 42 of a straight (linear) rolling channel 20 at a combined rolling and perforating station 16.

In accordance with a feature of the invention, filter cigarettes 4 are removed from their flutes 8 at the inlet 42 of the rolling channel 20 and are returned onto the conveyor 6 (namely into the oncoming empty flutes 8) at the outlet 46 of the channel 20. The conveyor 6 advances the treated cigarettes 4 to a transfer station T2 where the oncoming flutes 8 are relieved of their contents by a third wheel- or drum-shaped conveyor 10 which delivers cigarettes to the next processing station (not shown), e.g., to a cutoff where successive filter cigarettes of double unit length are severed midway across their filter mouthpieces (e.g., in a manner as described and shown in the aforementioned U.S. Pat. No. 5,135,008 to Desterling at al.) prior to being transported to a packing machine, e.g., a machine known as COMPAS 500 which is distributed by the assignee of the present application.

The flutes 2a of the conveyor 2 communicate with suction ports 2' which are in communication with a suitable suction generating device during advancement of flutes 2a from a station where the conveyor 2 receives filter cigarettes of double unit length from a maker of filter cigarettes to a transfer station T1 between the conveyors 2 and 6. Analogously, the flutes 8 of the conveyor 6 communicate with suction ports 8' which are connected with a suction generating device during advancement from the transfer station T1 to the inlet 42 of the rolling channel 20 and from the outlet 46 of the rolling channel to the transfer station T2. The flutes 10a of the conveyor 10 are in communication with suction ports 10' which are connected with a suction generating device during advancement from the transfer station T2 to the locus where the flutes 10a deliver their contents to the packing machine.

FIG. 1 further shows a source 15 of at least one pulsed beam 12 of penetrative radiation. The source 15 can constitute a laser and the beam 12 impinges upon a pivotable mirror 14 which directs the beam upon a combined focussing and correcting means 18 including one or more optical elements serving to focus the beam upon the tubular envelope or wrapper 4a of the cigarette 4 then located in the channel 20 and being caused to toll about its axis 4b (see FIG. 3) between the surfaces 28 and 24 of rolling members 30, 26, respectively. The height of the rolling channel 20 (i.e., the distance between the surfaces 28, 24 at the combined rolling and perforating station 16) is preferably rather close to but slightly less than the outer diameter 34 of the wrapper 4a of a filter cigarette 4. On its way from the focussing means 18 against the wrapper 4a of the filter cigarette 4 in the channel 20, each beam 12 is caused to propagate itself along a path extending through an opening or window 32 in the stationary rolling member 30.

The distance covered by a cigarette during sidewise movement from the inlet 42 to the outlet 46 of the rolling channel 20 is selected in such a way that the cigarette completes at least one full revolution about its longitudinal axis 4b. This ensures that the wrapper 4a can be provided with at least one circumferentially complete annulus of perforations. The optical focussing element 18 is set up to correct the beam 12 in such a way that the beam impinges upon the external surface of the rolling wrapper 4a at least substantially at right angles, i.e., in the plane of the longitudinal axis 4b of the filter cigarette 4 in the channel 20.

The rolling member 30 of the perforating apparatus 1 is a stationary block which is installed on a base or frame (not shown) at the combined rolling and perforating station 16. The other rolling member 26 is or includes an endless flexible member, e.g., a belt which is trained over several rollers or pulleys including a driver pulley 38, idler pulleys or rollers 36a, and guide pulleys or rollers 36, 36'. The rollers 36, 36' and 36a are installed in an internal recess or groove 6a of the conveyor 6, i.e., a substantial portion of the endless rolling member 26 in the apparatus 1 of FIG. 1 is confined within the outlines of the conveyor 6. The direction in which the conveyor 6 is rotated by a prime mover (not shown) is indicated by an arrow 22, and the direction in which the pulley 38 drives the flexible rolling member 26 is indicated by an arrow 40.

The rollers 36a and the guide rollers 36, 36' are mounted in a frame having one or more portions (not shown) extending into the recess 6a. The guide roller 36 is mounted at the inlet 42 of the rolling channel 20, and the guide roller 36' is mounted at the outlet 46 of this channel. The distance between the axes of parallel shafts 44, 48 for the respective guide rollers 36, 36' at least equals but can exceed the circumferential length of the wrapper 4a of a filter cigarette 4; this ensures that each cigarette is caused to complete at least one full revolution about its axis 4b while it rolls along the surfaces 28, 24 of the rolling members 30, 26 from the inlet 42 to the outlet 46 of the rolling channel 20.

The positions of the guide rollers 36, 36' relative to the endless circular path of the flutes 8 are selected in such a way that successive increments of the endless rolling member 26 lift a cigarette 4 arriving at the inlet 42 off the conveyor 6 (i.e., out of the respective flute 8), and the guide roller 36' permits the cigarette 4 having a freshly perforated wrapper 4a to enter the oncoming empty flute 8, and to advance with the conveyor 6 toward the transfer station T2 (where such cigarette is caused to enter and to be attracted into the oncoming flute 10a of the rotary drum- or wheel-shaped conveyor 10).

An advantage of the guide roller 36 is that the adjacent portion of the running belt-shaped rolling member 26 can gently lift the oncoming filter cigarette 4 out of its flute 8 and gently move such cigarette out of contact with the conveyor 6 toward contact with the surface 28 of the stationary rolling member 30.

The speed of the belt-shaped rolling member 26 is selected in such a way that it at least slightly exceeds the peripheral speed of the conveyor 6 in the rolling channel 20. Such selection of the speed of the flexible rolling member 26 ensures that a filter cigarette 4 which was lifted out of its flute 8 at the inlet 42 of the rolling channel 20 can reenter the same flute 8 upon arrival at the outlet 46 of such channel. That portion of the speed of the rolling member 26 which is in excess of twice the peripheral speed of a conveyor 6 in the channel 20 is necessary or desirable to account for the difference between (a) the distance covered by a flute 8 from the inlet 42 to the outlet 46 of the channel 20 and (b) the somewhat greater distance covered by a cigarette 4 which leaves its flute 8 at the guide roller 36 and reenters the (same) flute at the guide roller 36'.

The center of curvature of the concave portion 28A (see FIG. 3) of the stationary rolling surface 28 at the inlet 42 of the rolling channel 20 is located on the axis of the shaft 44, and the center of curvature of the concave portion 28B of the rolling surface 28 at the outlet 46 of the channel 20 is located on the axis of the shaft 48 for the guide roller 36'.

It will be seen that the mobile rolling surface 24 is defined by that portion of the moving flexible rolling member 26 which extends between the guide rollers 36 and 36'. Such portion of the rolling member 26 cooperates with the fixed surface 28 of the rolling member 30 to cause the cigarette 4 in the channel 20 to rotate about its axis 4b while rolling from the inlet 42 to the outlet 46 of the channel 20.

Figure 2:
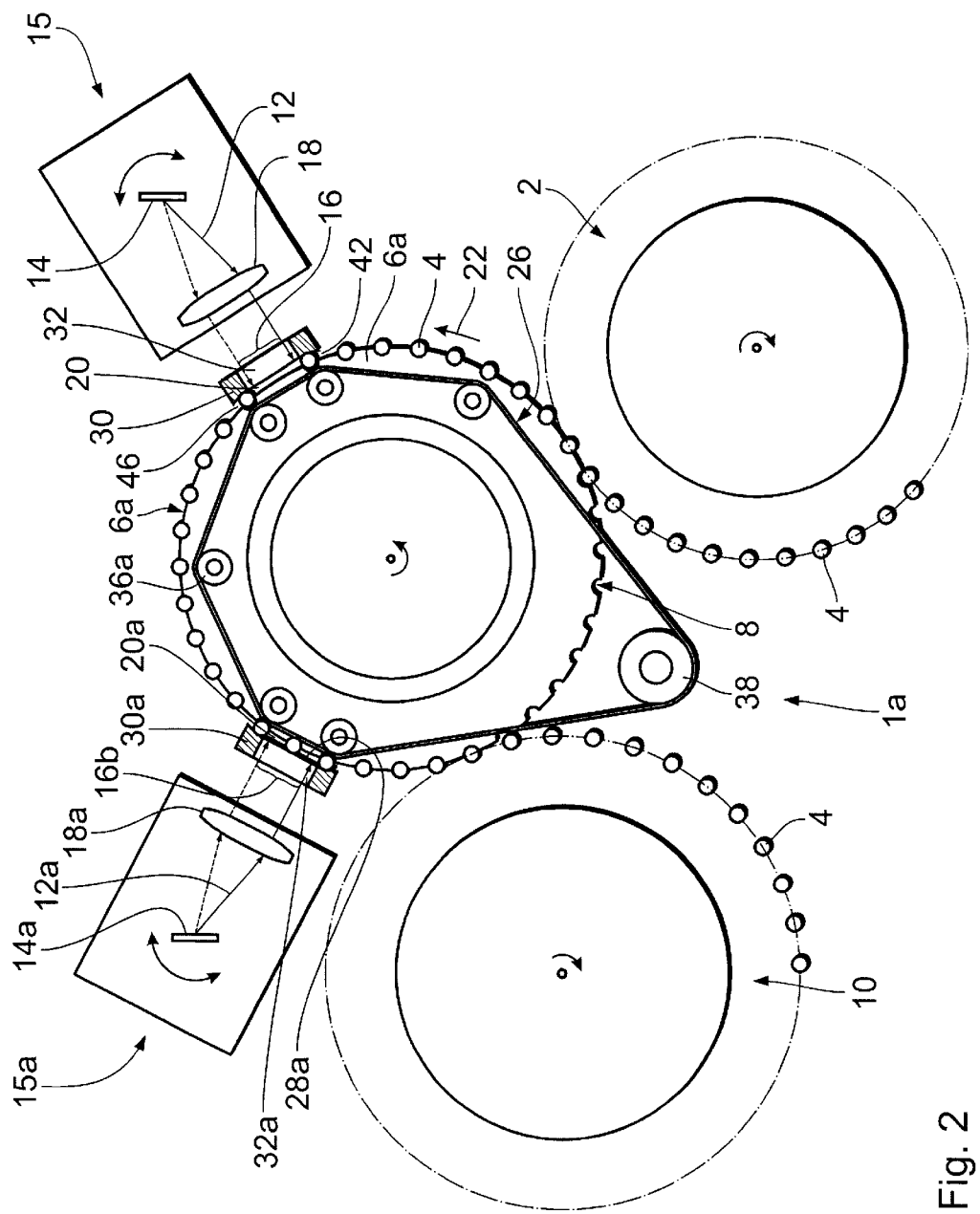
FIG. 2 is a similar schematic partly elevational and partly sectional view of a modified apparatus with a series of two successive combined article rolling and article perforating stations.

FIG. 2 illustrates certain features of a modified perforating apparatus 1a. Those parts of the apparatus 1a which are identical with or plainly analogous to the parts of the apparatus 1 of FIG. 1 are denoted by similar reference characters. The main difference between the apparatus 1 and 1a is that the latter further comprises a second source (15a) of penetrative radiation including a mirror 14a and an optical element 18a serving to focus at least one second beam of penetrative radiation upon that portion of the flexible rolling member 26 which confronts the rolling surface 28a of a second stationary rolling member 30a. That portion of the rolling member 30a which is located at a second rolling station 16a is provided with at least one window or opening 32a serving to establish a portion of the path for propagation of the beam or beams 12a which impinges or impinge upon the cigarette 4 rolling and moving sideways in the second rolling channel 20a.

The manner in which a filter cigarette 4 advancing from its flute 8 into the channel 20a and back into its flute 8 is caused to roll while moving sideways, and in which such filter cigarette is provided with at least one annular array of perforations is the same as or similar to that during travel in the rolling channel 20.

The perforating unit including the radiation source 15a is preferably identical with the perforating unit including the radiation source 15, and the same an applies for the treatment of each filter cigarette 4 during sidewise movement through the rolling channels 20 and 20a; this ensures that the permeability of the wrappers of all filter cigarettes of unit length matches or very closely approximates an optimum permeability. The reason for the making of perforations in the wrappers of filter mouthpieces is that it is believed to be beneficial if the inflowing atmospheric air entering the filter mouthpiece is mixed with tobacco smoke prior to being drawn into a smoker's mouth.

The distance between each pair of neighboring flutes 8a in the Conveyor 6a of FIG. 2 is half the distance between the flutes 8 of the conveyor 6 shown in FIG. 1. Therefore, the beam or beams 12 perforates or perforate the wrapper of each oddly numbered cigarette 4 of the series of cigarettes on the conveyor 6a, and the beam or beams 12a perforates or perforate the wrapper of each evenly numbered cigarette of the aforementioned series.

Alternatively, if the conveyor 6a of FIG. 2 is replaced with the conveyor 6 of FIG. 1, the rolling channel 20a is offset relative to the channel 20 in the axial direction of the flutes 8 so that each cigarette 4 advancing along the elongated arcuate path defined by the respective flute 8 is provided with two annuli of perforations, For example, one of these annuli can be provided in the tubular wrapper of one half of the filter rod section of double unit length, and the other annulus can be provided in the tubular wrapper of the other half of such filter rod section. Consequently, when the filter cigarette 4 of double unit length is thereupon severed midway across its filter rod section of double unit length, the filter mouthpiece of each of the thus obtained pair of filter cigarettes of unit length is provided with an annulus of perforations.

Figure 3:
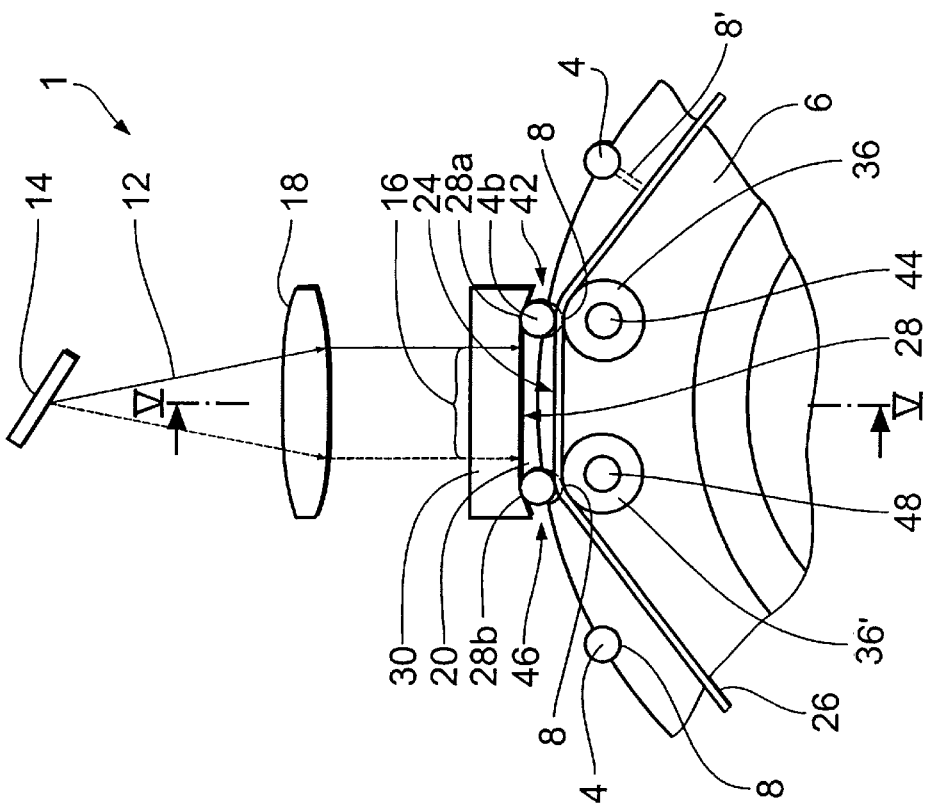
FIG. 3 is an enlarged view of a detail in the apparatus of FIG. 1.

FIG. 3 is an enlarged view of that portion of the perforating apparatus 1 of FIG. 1 which defines the rolling station 16. It will be seen that the peripheral surface of the wheel- or drum-shaped conveyor 6 is a cylindrical surface which is provided with equidistant flutes 8. FIG. 3 further shows a suction port 8' which communicates with the suction intake of a suction generating device (not shown) during advancement of the respective flute from the transfer station T1 of FIG. 1 to the inlet 42 of the channel 20 and from the outlet 46 of the channel 20 to the transfer station T2, all as already described with reference to the apparatus 1 of FIG. 1.

Figure 4:
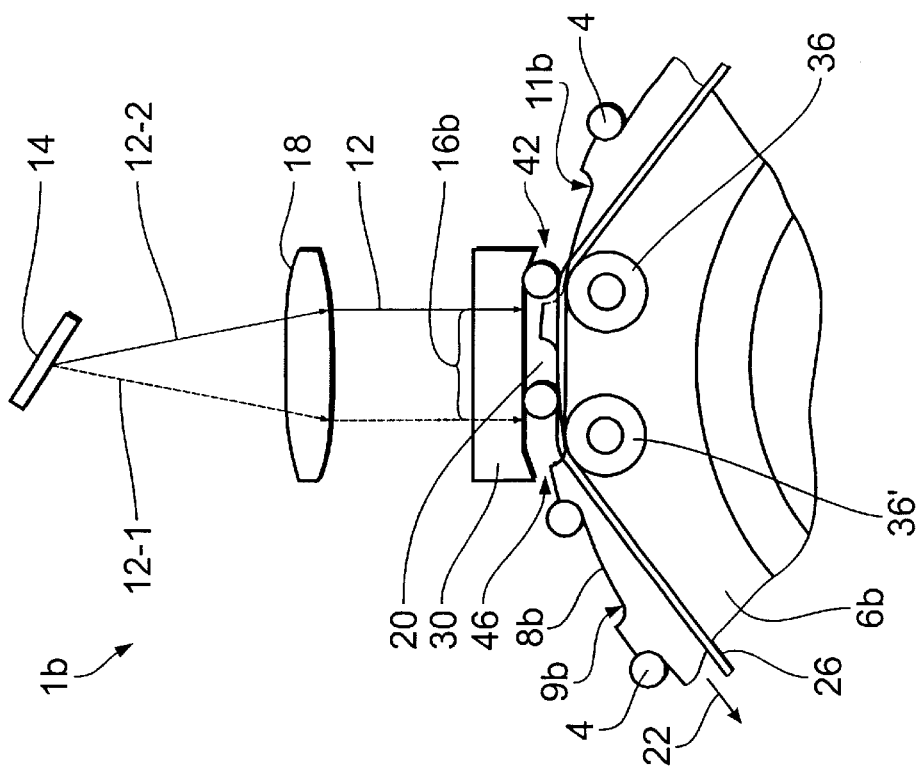
FIG. 4 is a similar view of a detail of an apparatus resembling that of FIGS. 1 and 3 but employing modified conveying means for rod-shaped articles.

Deferring to FIG. 4, there is shown a portion of a further perforating apparatus 1b having a modified wheel- or drum-shaped conveyor 6b with different receiving means 8b for filter cigarettes 4 of double unit length. In contrast to the apparatus of FIGS. 1 and 3 wherein the speed of the endless flexible rolling member 26 is twice the peripheral speed of the conveyor 6, the speed of the rolling member 26 in the apparatus 1b of FIG. 4 is less than twice the peripheral speed of the conveyor 6b. Therefore, a filter cigarette 4 at the rolling station 16b of FIG. 4 moves forwardly (in the direction indicated by the arrow 22) at a speed less than the peripheral speed of the conveyor 6b. Consequently, the modified flutes 8b in the peripheral surface of the conveyor 6b are elongated (as seen in the direction of the arrow 22).

The speed of the flexible rolling member 26 is selected in such a way that a filter cigarette 4 which is located at the front end 9b of the respective flute 8b at the time of arrival into the inlet 42 of the rolling channel 20 is caused to move sideways at a speed less than the peripheral speed of the conveyor 6b, namely at a speed such that this filter cigarette reaches the outlet 46 of the channel 20 while it is located at the rear or trailing end 11b of its flute 8b.

An advantage of the perforating apparatus 1b is that the filter cigarettes 4 are subjected to a treatment (namely by the conveyor 6b and by the rolling members 30, 26) which is even gentler than that in the perforating apparatus 1 or 1a. This results in a further reduction of the number of rejects.

The pivotable mirror 14 of the radiation source in the apparatus 1b of FIG. 4 causes the beam 12 of penetrative radiation to change its orientation between the solid-line position 12-2 and the broken-line position 12-1 during impingement upon the tubular wrapper of the filter cigarette 4 rolling in the respective flute 8b, i.e., during movement from the front end 9b to the trailing end 11b of such flute. In all other respects, the perforating apparatus 1b is or can be identical with the apparatus 1.

Figure 5:
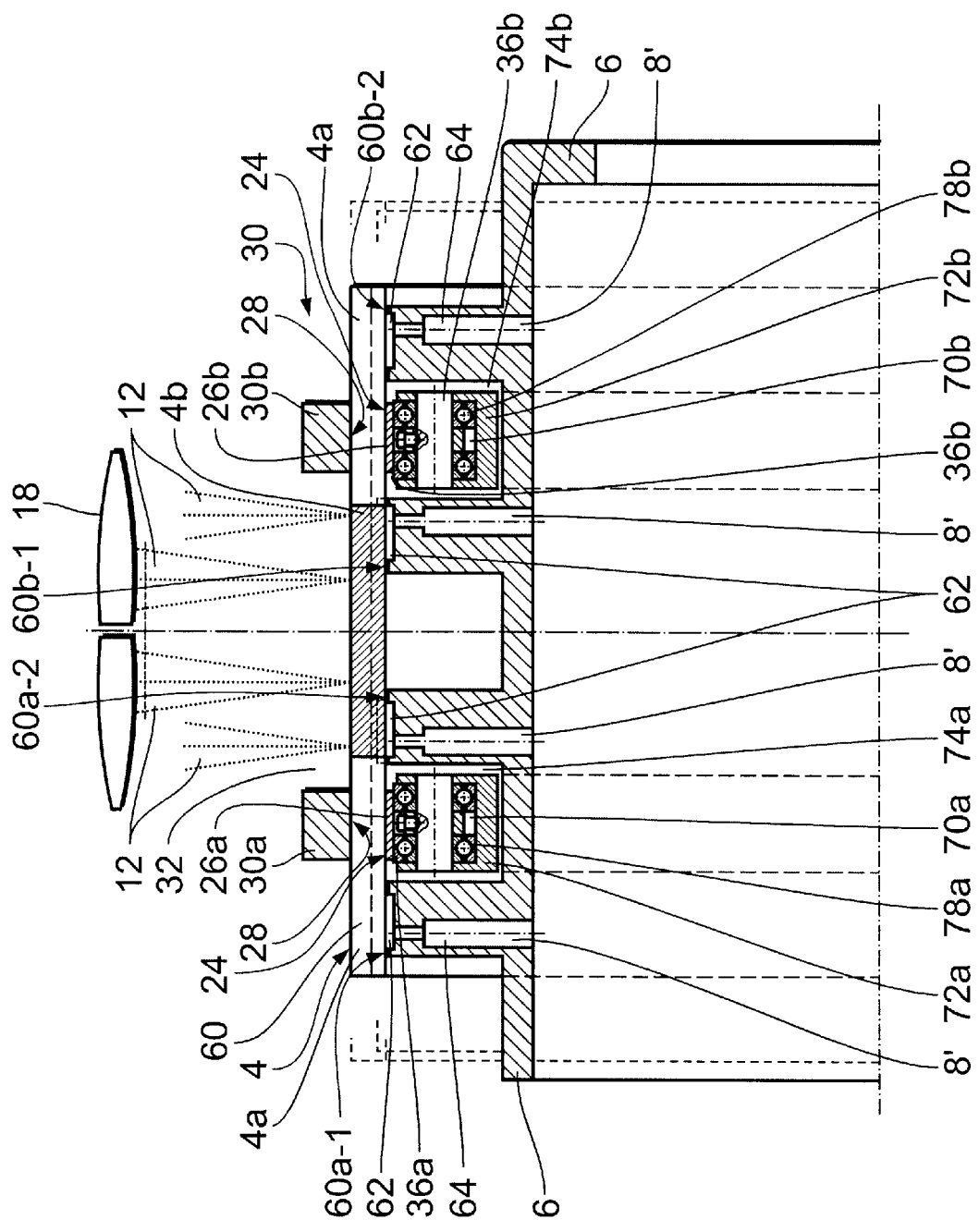
FIG. 5 is a sectional view substantially as seen in the direction of arrows from the line V—V of FIG. 3 but showing certain details of an apparatus which constitutes another modification of the apparatus shown in FIGS. 1 and 3.

FIG. 5 shows that the perforating apparatus of FIGS. 1 and 3 can be utilized to simultaneously provide the wrapper 4a of each of a series of successive filter cigarettes 4 with two annuli of perforations. Such annuli of perforations are provided in the two halves of the tubular wrapper of the filter mouthpiece 4B of double unit length which is located between two plain cigarettes 4A of unit length. The source 15 (not shown in FIG. 5) emits four pulsating beams 12 which are focussed by the optical element or elements 18 in such a way that each half of the wrapper of the filter mouthpiece 4B of double unit length is provided with two annuli of perforations.

The stationary rolling member 30 includes two sections 30A, 30B each of which provides one-half of the composite stationary rolling surface 28. Analogously, the endless mobile rolling member comprises two endless sections 26a, 26b having external surfaces cooperating with the respective halves of the stationary rolling surface 28. The opening or window 32 is located between the two halves 30A, 30B of the stationary rolling member 30 and its width (as measured longitudinally of the filter cigarette 4 in the rolling channel) is sufficient to enable all four beams 12 to impinge upon the wrapper of the filter mouthpiece 48 (of double unit length) of the cigarette 4 in the rolling channel.

FIG. 5 shows only the two parts 36A, 36B of the roller 36; these parts respectively engage the adjacent sections 26a, 26b of the flexible rolling member at the inlet 42 (see FIGS. 1 and 3) of the rolling channel 20. The non-illustrated roller 36' of the apparatus including the structure of FIG. 5 also includes two parts corresponding to the parts 36A, 36B of the composite guide roller 36 and serving to engage and guide successive increments of the flexible sections 26a, 26b at the outlet 46 (see FIGS. 1 and 3) of the rolling channel 20.

The part 36A of the roller 36 lifts the left-hand plain cigarette 4A and the left-hand half of the filter mouthpiece 4B off the portions 60a-1 and 60a-2 of the peripheral surface 60 of the conveyor 6, and the part 36B of the roller 36 lifts the right-hand plain cigarette 4A and the right-hand half of the filter mouthpiece 4B off the adjacent portions 60b-1 and 60b-2 of the conveyor 6. The parts 36A, 36B are located in substantially U-shaped recesses 70a, 70b of the conveyor 6 and are mounted on substantially sickle-shaped stationary holders or supports 72a, 72b. These holders extend into U-shaped grooves 74a, 74b in the peripheral surface 60 of the conveyor 6.

FIG. 5 further shows antifriction bearings 78a, 78b having outer races which constitute the parts 36A, 36B of the guide roller 36, i.e., such outer races are contacted by successive increments of the respective sections 26a, 26b of the composite endless flexible rolling member.

The portions 60a-1, 60a-2 and 60b-1, 60b-2 of the peripheral surface 60 of the conveyor 6 are provided with recesses 62 communicating with the suction ports 8' which, in turn, communicate with a suitable suction generating device during advancement of flutes 8 from the transfer station T1 of FIG. 1 to the inlet 42 of the rolling channel 20 and again from the outlet 46 of such channel to the transfer station T2 between the conveyors 6 and 10.

An important advantage of a perforating apparatus 1 which embodies the structure shown in FIG. 5 over the perforating apparatus 1A of FIG. 2 is that all perforations in the wrappers 4a of successive filter cigarettes 4 are provided at a single perforating station 16.

The perforating apparatus of the present invention can be equipped with light refracting means through which the beam or beams of radiation must pass on its or their way into contact with the peripheral surface of the wrapper of a cigarette advancing in the rolling channel. Such light refracting means are disclosed in the aforesaid copending parent application Ser. No. 09/457,346.

Figure 6:
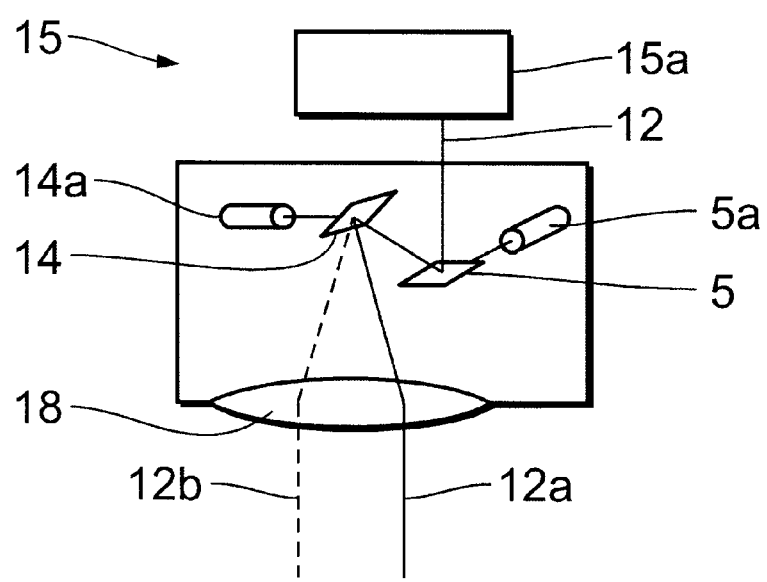
FIG. 6 is a schematic elevational view of a source of penetrative radiation and of means for directing a beam of radiation upon successive rod-shaped articles.

FIG. 6 shows certain details of the source 15; this source is or can be identical with that shown in FIG. 1 of the parent application Ser. No. 09/457,346. The source 15 comprises a laser 15A arranged to emit a pulsed beam 12 which impinges upon a first mirror 5 pivotable by a first motor 5A and serving to direct the beam 12 against a second mirror 14 (see also FIG. 1) which is pivotable by a second motor 14A. The mirror 14 compels the beam 12 to move between the expreme positions 12A, 122 in synchronism with the advancement of cigarettes 4 through the rolling channel 20. The optical unit 18 can constitute an F-theta lens which can focus the beam 12 upon the wrapper of the cigarette in the rolling channel 20 while the cigarette advances sideways from the inlet 42 to the outlet 46 of the rolling channel.

Figure 7:
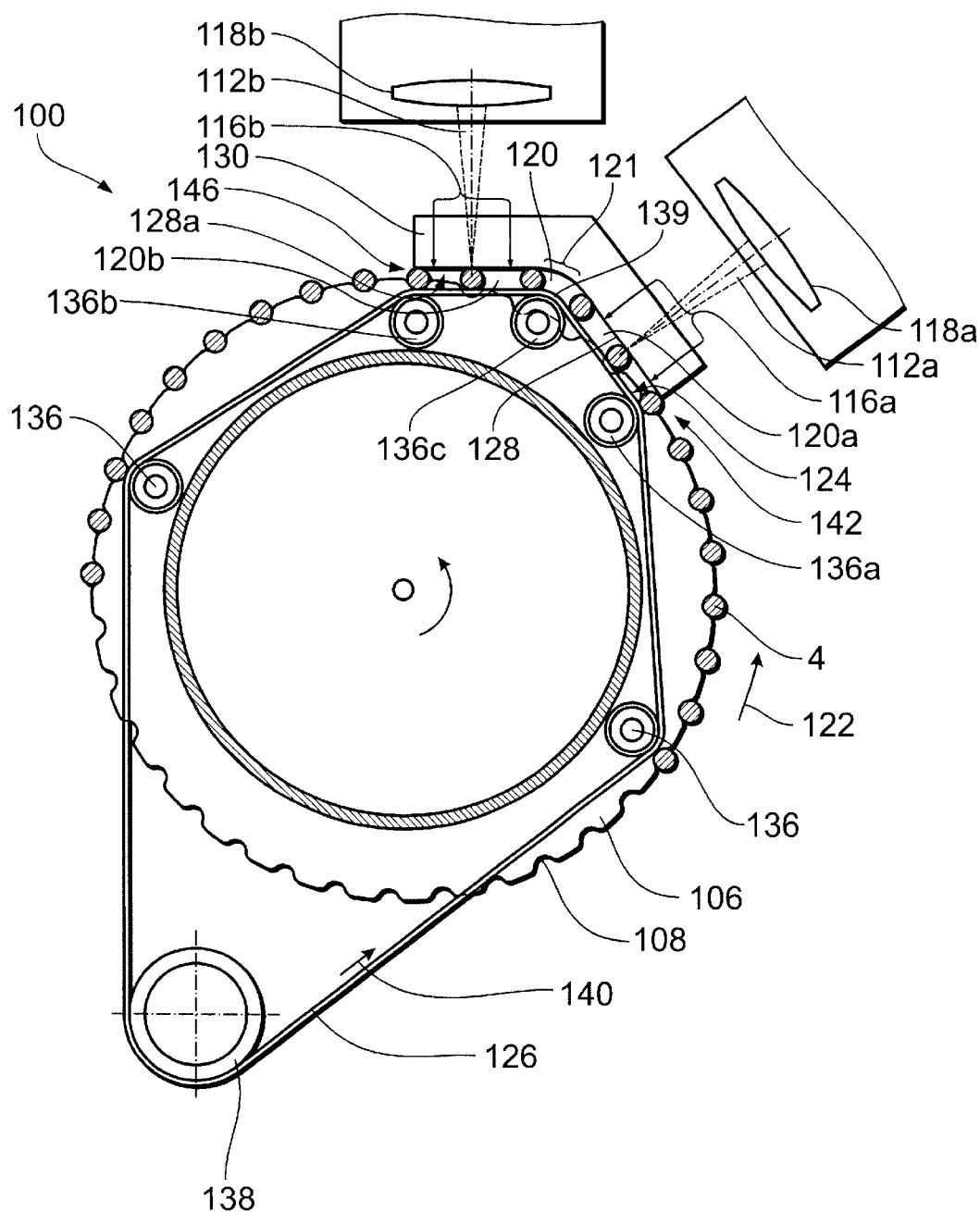
FIG. 7 is a fragmentary schematic partly elevational and partly sectional view of a further perforating apparatus which embodies the present invention.

FIG. 7 illustrates a further perforating apparatus 100. All such parts of this apparatus which are identical with or plainly analogous to the corresponding parts of the apparatus 1a shown in FIG. 2 are denoted by similar reference characters plus 100. An important difference between the apparatus 1a and 100 is that the latter employs a single rolling channel 120 including two mutually inclined sections 120a and 120b which are respectively provided at the two discrete perforating stations 116a, 116b. The channel section 120a begins at the inlet 142, and the channel section 120b ends at the outlet 146 of the substantially V-shaped channel 120. The sections 120a, 120b make an obtuse angle, e.g., an angle which equals or approximates 150°. The perforating station 116b is located downstream of the station 116a, as seen in the direction of the sidewise movement of successive filter cigarettes 4 with the fluted article advancing conveyor 106.

The reference character 121 denotes a curved intermediate or transition zone between the channel sections 120a, 120b; this zone is defined by an intermediate pulley 136c located between the pulleys 136a and 136b which are respectively disposed at the inlet and outlet of the channel 120. Thus, the section 120a extends from the pulley 136a to the pulley 136c, and the sects on 120b extends from the pulley 136c to the pulley 136b. The curvature of the intermediate zone 139 of the composite channel 120 depends upon the magnitude of the angle enclosed by the channel sections 120a, 120b and is complementary to that of the (median) portion of the surface of the rolling member 130 between the surfaces 128 and 128a. The width of the channel 120 is preferably constant from end to end. The straight portions 124, 124a of the external (rolling) surface of the mobile rolling belt 126 confront the straight stationary mutually inclined rolling surfaces 128, 128a of the respective sections of the substantially V-shaped rolling member 130. The width of the substantially V-shaped composite rolling channel 120 is the same all the way from the pulley 136a to the pulley 136b. The surfaces 128, 128a of the rolling member 130 lack concave portions which would correspond to those shown at 28A, 28B in FIG. 3. This is due to the fact that the rolling surface 128 is parallel to the straight portion of the rolling belt 126 all the way from the periphery of the pulley 136a to the periphery of the intermediate pulley 136c, and that the straight rolling surface 128a of the rolling member 130 between the pulleys 136c, 136b is parallel to the straight portion of the belt 126 between the peripheries of the pulleys 136c, 136b.

In order to compensate for the increased length (at 139) of the composite channel 120, the speed of the belt 126 is selected in such a way that it exceeds twice the peripheral speed of the drum-shaped conveyor 106. This ensures that a filter cigarette 4 leaving a flute 108 of the drum-shaped conveyor 106 reenters the same flute 108 at the outlet of the section 120b of the channel 120.

An advantage of the apparatus 100 (as compared with the apparatus 1a a portion of which is shown in FIG. 2) is that the filter cigarettes 4 need not leave the single rolling channel 120 during advancement (at 139) between the channel sections 120a and 120b where they are treated by the laser beams 112a, 112b being respectively focussed by the optical elements 118a and 118b. In other words, the likelihood of misalignment of the rod-shaped articles during advancement (at 139) from the channel section 120a (wherein they are provided with at least one annulus of perforations by the laser at the station 116a) to the channel section 120b (wherein they are provided with at least one annulus of perforations by the laser at the station 116b) is greatly reduced, i.e., even less than in the apparatus 1a of FIG. 2.

Figure 8:
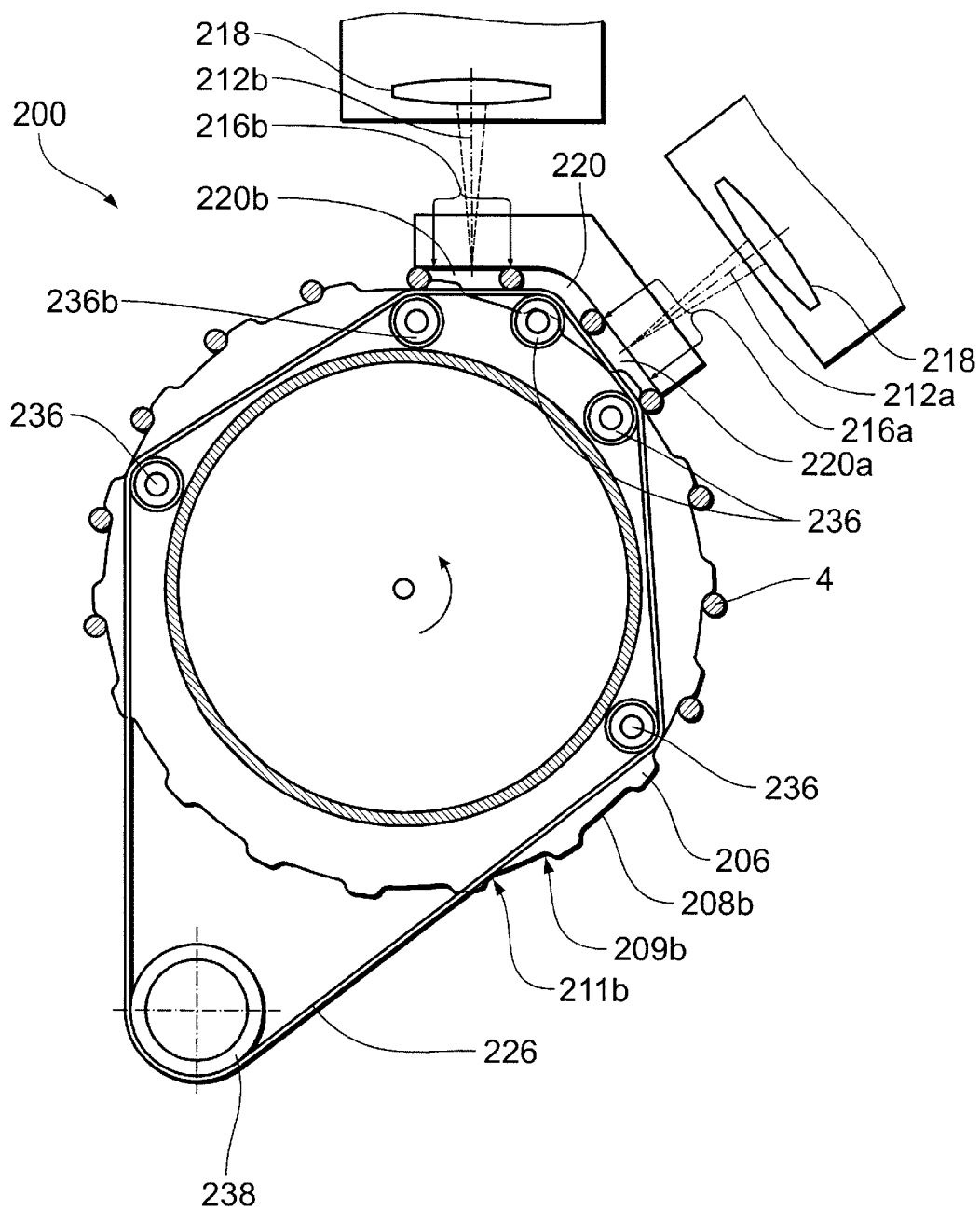
FIG. 8 is a similar fragmentary partly elevational and partly sectional view of an additional embodiment of the improved apparatus.

All such parts of the perforating apparatus 200 shown in FIG. 8 which are identical with or plainly analogous to the corresponding parts in the perforating apparatus 100 of FIG. 7 are denoted by similar reference characters plus 100. The main difference between the apparatus 100 and 200 is that the latter employs a drum-shaped conveyor 206 with receiving means or flutes 208b analogous to those shown at 8b in FIG. 4. Thus, each flute 206 has a concave front end 209b and a concave trailing end 211b. The purpose of such configuration of the flutes 208b is the same as that of the configuration of the flutes 8b.

An advantage of the perforating apparatus 200 is that the first laser beam 212a provides the wrappers of successive filter cigarettes 4 in the first section 220a of the single (V-shaped) channel 220 with first circular arrays of perforations, and that a second circular array of perforations is provided by the laser beam 212a in the wrappers of cigarettes 4 rolling in the second section 220b of the same channel 220. The lasers 212a, 212b operate (or can operate) independently of each other.

Figure 9:
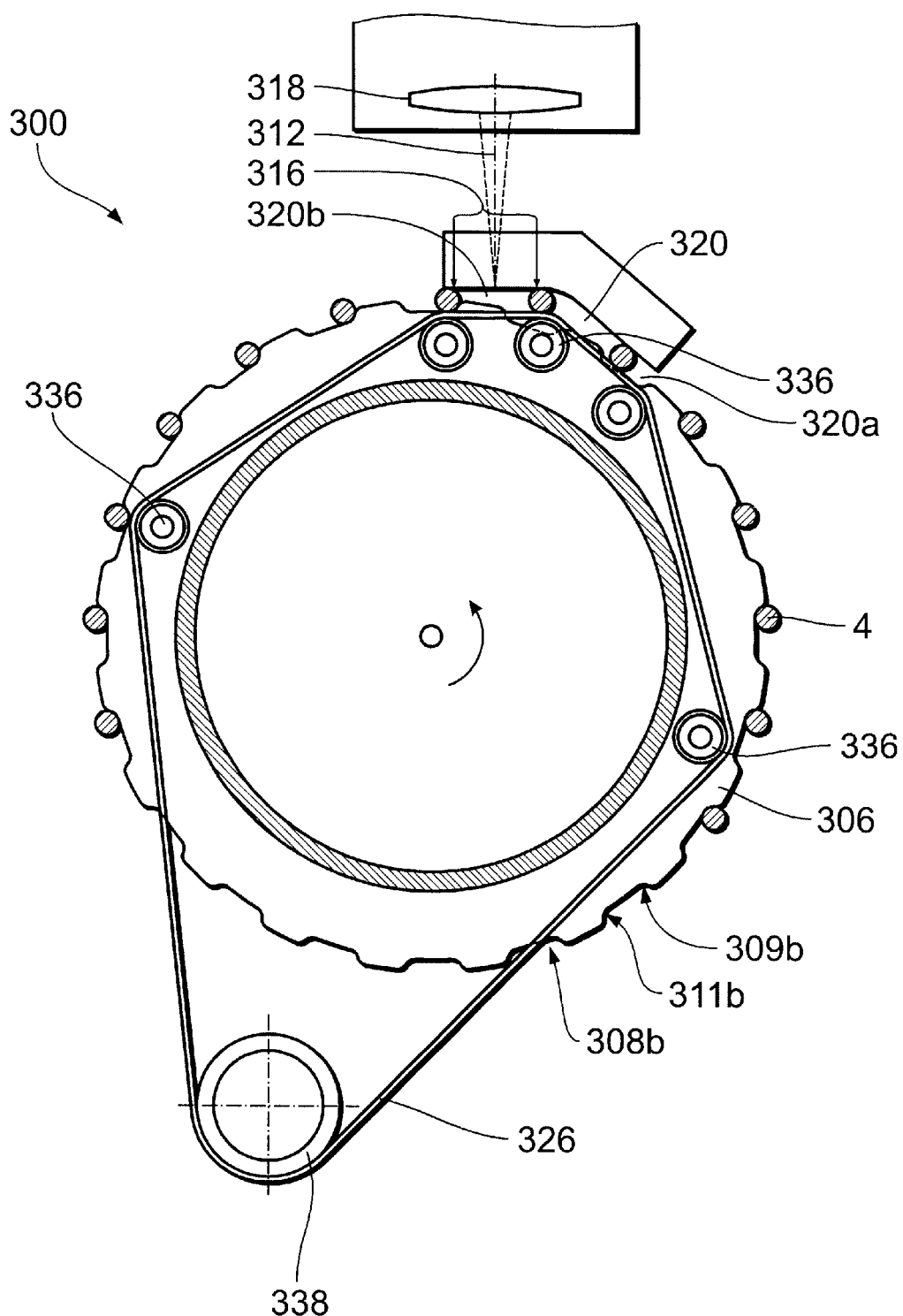
FIG. 9 is a similar fragmentary partly elevational and partly sectional view of still another embodiment of the improved apparatus.

The perforating apparatus 300 of FIG. 9 constitutes a modification of the just described apparatus 200, The difference is that the apparatus 300 operates with a single laser which emits a beam 312 into the section 320b of the single (V-shaped) rotting channel 320. The latter is shorter than the rolling channel 220 of FIG. 8; its length corresponds to 2.5 times the distance between successive filter cigarettes 4 in the flutes of the drum-shaped conveyor 306. This is possible because the first section 320a of the rolling channel 320 serves exclusively to effect an acceleration of rolling movement of successive filter cigarettes 4 from zero rolling speed to the required rolling speed in the section 320b; this results in gentler treatment of cigarettes 4 in the rolling channel 320.

The peripheral surface of the median pulley 336 shown in FIG. 9 extends only slightly beyond the peripheral surface of the drum-shaped conveyor 306.

All referenced parts shown in FIG. 9 but not specifically mentioned herein correspond to the similarly referenced parts of the apparatus 100 of FIG. 7 or of the apparatus 200 shown in FIG. 8.

Without further analyses, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of perforating the wrappers of cigarettes or the like and, therefore, such adaptations should and are intended to be comprehended within the meaning and range of equivalence of the appended claims.

What is claimed is:

1. Apparatus for increasing the permeability of a tubular wrapper of an elongated rod-shaped article having a longitudinal axis and a predetermined diameter, comprising:
    a first rolling member;
    a second rolling member movable relative to said first member, said first and second members respectively having first and second rolling surfaces defining at least one rolling channel having a height such that, as a result of movement of said second member relative to said first member and upon entry into said at least one channel, the article is compelled to roll about its axis and to move sideways from an inlet to an outlet of the at least one channel;
    a source of at least one beam of penetrative radiation;
    means for focussing said at least one beam along at least one path defined by one of said members and upon the wrapper of the article rolling in said at least one channel; and
    means for conveying the article toward said inlet and away from said outlet, said second member comprising at least one flexible element having a portion located within said conveying means.

2. The apparatus of claim 1, wherein said first, rolling member is stationary and said at least one flexible element is an endless flexible element, said conveying means comprising a rotary wheel-shaped conveyor.

3. The apparatus of claim 1, further comprising means for guiding said portion of said at least one flexible element along a path which extends between said inlet and said outlet and wherein the article is disengaged from said conveying means and is free to roll about its axis as a result of contact with said surfaces.

4. The apparatus of claim 1, further comprising means for guiding said at least one flexible element, including at least 2n rollers wherein n is the number of rolling channels.

5. The apparatus of claim 4, wherein said conveying means has at least one recess for said rollers.

6. The apparatus of claim 1, wherein the tubular wrapper of the article has a predetermined circumferential length and further comprising first and second guide rollers respectively located at said inlet and said outlet and being respectively rotatable about first and second axes, said portion of said at least one flexible element being adjacent said at least one channel and being arranged to disengage the article from said conveying means and to maintain the article in contact with said first surface, the axes of said rollers being spaced apart from each other a distance at least matching said circumferential length so that the article completes at least one revolution about its axis while rolling during advancement from said inlet to said outlet.

7. The apparatus of claim 1, further comprising means for effecting a transfer of the article from said conveying means onto said portion of said at least one flexible element at said inlet.

8. The apparatus of claim 7, further comprising means for effecting a transfer of the article from said portion of said at least one flexible element onto said conveying means at said outlet.

9. The apparatus of claim 1, wherein said conveying means is arranged to transport the article sideways along an elongated path extending toward, through and beyond said at least one rolling channel and further comprising a third rolling member adjacent said elongated path downstream of said outlet and defining with said second rolling member a second rolling channel, said second rolling member cooperating with said third rolling member to cause the article to roll about its axis during sidewise movement through said second channel and further comprising a second source of at least one second beam of penetrative radiation and means for focussing said at least one second beam along at least one path defined by one of said second and third rolling members and upon the wrapper of the article rolling in said second channel.

10. The apparatus of claim 9, wherein said conveying means includes means for transporting along said elongated path a series of successive articles so that one article of the series is caused to roll in said at least one channel while another article of the series is caused to roll in said second channel.

11. The apparatus of claim 1, wherein said portion of said flexible element maintains the article out of contact with said conveying means while the article is caused to roll in said at least one channel.

12. The apparatus of claim 1, wherein said first rolling member is stationary and said at least one path is defined at least in part by at least one opening provided in said first rolling member.

13. The apparatus of claim 1, wherein said at least one channel is a linear channel.

14. The apparatus of claim 1, wherein at least one of said rolling surfaces has a curved portion in the region of at least one of said inlet and said outlet.

15. The apparatus of claim 14, wherein said curved portion is provided on said first rolling surface.

16. The apparatus of claim 14, wherein said curved portion is a concave portion of the respective rolling surface.

17. The apparatus of claim 14, further comprising guides rotatable about parallel axes and provided for said portion of said at least one flexible element at the inlet and at the outlet of said at least one rolling channel, said curved portion forming part of said first rolling surface and having a center of curvature on the axis of one of said guides.

18. The apparatus of claim 1, wherein said rolling members define a second rolling channel aligned with said at least one channel and further comprising a source of at least one second beam of penetrative radiation and means for focussing said at least one second beam upon a second portion of the article rolling in said second channel while a first portion of the article rolls in said at least one channel.

19. The apparatus of claim 1, wherein said at least one rolling channel has mutually inclined first and second sections respectively adjacent said inlet and said outlet, said second rolling surface having a curved intermediate zone between said sections of said channel.

20. The apparatus of claim 19, further comprising first and second guide rollers adjacent said second rolling surface at said inlet and said outlet, respectively, and a third guide roller adjacent said intermediate zone of said second rolling surface, said flexible element being trained over said guide rollers.

21. The apparatus of claim 19, wherein said first rolling surface includes a median portion complementary to and confronting said intermediate zone.

22. The apparatus of claim 19, wherein said focussing means comprises means for focussing said at least one beam of penetrative radiation along a single path upon the wrappers of successive articles rolling in said second section of said at least one channel.

23. The apparatus of claim 19, wherein said source includes means for generating first and second beams of penetrative radiation and said focussing means comprises first and second focussing units for respectively directing said first and second beams of penetrative radiation upon the wrappers of successive articles rolling in said first and second sections of said at least one channel.

24. The apparatus of claim 19, wherein said first and second sections of said rolling channel make an obtuse angle.

25. The apparatus of claim 24, wherein said angle at least approximates 150°.

26. The apparatus of claim 1, wherein said rolling members constitute the only means for moving articles in said channel from said inlet to said outlet.

* * * * *